United States Patent
Peltz

(10) Patent No.: US 8,844,641 B2
(45) Date of Patent: Sep. 30, 2014

(54) DEVICE FOR CONTAINING AND/OR SUPPRESSING A FIRE

(75) Inventor: Jeffrey E. Peltz, Memphis, TN (US)

(73) Assignee: Federal Express Corporation, Memphis, TN (US)

( * ) Notice: Subject to any disclaimer, the term of this patent is extended or adjusted under 35 U.S.C. 154(b) by 1289 days.

(21) Appl. No.: 11/283,883

(22) Filed: Nov. 22, 2005

(65) Prior Publication Data
US 2006/0207773 A1   Sep. 21, 2006

Related U.S. Application Data

(60) Provisional application No. 60/663,212, filed on Mar. 21, 2005.

(51) Int. Cl.
| | | |
|---|---|---|
| *A62C 8/00* | (2006.01) | |
| *B60P 7/08* | (2006.01) | |
| *A62C 2/10* | (2006.01) | |
| *A62C 3/02* | (2006.01) | |
| *A62C 2/06* | (2006.01) | |
| *A62C 8/06* | (2006.01) | |

(52) U.S. Cl.
CPC ............. *B60P 7/0876* (2013.01); *A62C 2/10* (2013.01); *A62C 3/0257* (2013.01); *A62C 2/065* (2013.01); *A62C 8/06* (2013.01)
USPC ................................ 169/50; 169/48; 169/49

(58) Field of Classification Search
CPC ............ A62C 2/06; A62C 2/065; A62C 2/10; A62C 3/0257; A62C 8/06
USPC ............................................ 169/48, 49, 50
See application file for complete search history.

(56) References Cited

U.S. PATENT DOCUMENTS

| | | | | |
|---|---|---|---|---|
| 3,874,457 | A | * | 4/1975 | Thrash ............................ 169/47 |
| 6,415,927 | B1 | * | 7/2002 | Stone et al. ................... 206/600 |
| 6,637,991 | B2 | * | 10/2003 | Looker et al. ................... 410/97 |
| 6,983,805 | B2 | * | 1/2006 | Chattaway ....................... 169/46 |
| 2004/0262018 | A1 | * | 12/2004 | Roussin .......................... 169/50 |
| 2005/0025890 | A1 | | 2/2005 | Cheng |
| 2005/0150664 | A1 | * | 7/2005 | Miller et al. .................... 169/45 |

FOREIGN PATENT DOCUMENTS

| | | | |
|---|---|---|---|
| CA | 2 363 232 | A1 | 2/2002 |
| EP | 0492977 | A1 * | 12/1991 |
| EP | 0 492 977 | A1 | 7/1992 |
| EP | 492977 | A1 * | 7/1992 |
| GB | 2 390 302 | A | 1/2004 |
| GB | 2390302 | A * | 1/2004 |

OTHER PUBLICATIONS

International Search Report issued Aug. 16, 2006, in counterpart application No. PCT/US2006/009514.
Written Opinion issued Aug. 16, 2006, in counterpart application No. PCT/US2006/009514.

* cited by examiner

*Primary Examiner* — Ryan Reis
(74) *Attorney, Agent, or Firm* — Finnegan, Henderson, Farabow, Garrett & Dunner, L.L.P.

(57) ABSTRACT

A device for containing and/or suppressing a fire may include a flexible barrier configured to at least substantially cover at least one item located on a base structure. The flexible barrier may include a flexible sheet and an intumescent material layer substantially covering a surface of the flexible sheet.

13 Claims, 4 Drawing Sheets

DEVICE FOR CONTAINING AND/OR SUPPRESSING A FIRE

RELATED APPLICATION

This application claims the benefit of priority under 35 U.S.C. §119(e) of U.S. Provisional Application No. 60/663, 212, filed on Mar. 21, 2005, the disclosure of which is incorporated herein by reference.

FIELD OF THE INVENTION

The present invention relates to a device for containing and/or suppressing a fire. In particular, the present invention relates to a device for containing and/or suppressing a fire associated with objects located on a base structure.

BACKGROUND OF THE INVENTION

Objects may be stored and/or transported on base structures, for example, to organize or improve the ease of handling the objects. For example, freight may be placed on pallets stored and later shipped via aircraft, trucks, boats, and/or trains. Pallets may conform to industry standards, such as, for example, standards set forth by the International Air Transport Association (IATA) ULD Technical Manual. For example, two types of pallets used for shipping freight via aircraft are PMC pallets, which measure about 96 inches by about 125 inches, and PAG pallets, which measure about 88 inches by about 125 inches. Other types of pallets are known.

Examples of freight placed on pallets may include, for example, such objects as cardboard boxes containing clothing, hazardous materials containers, and/or explosives. Typically, the objects placed on pallets are not enclosed by anything other than, for example, shrink-wrap plastic, which tends to keep freight dry when exposed to rain, and/or pallet netting, which tends to prevent freight from shifting on the pallet during transport.

Such pallets may be transported via aircraft and may be loaded into an aircraft cabin such that they are open to the cabin and such that a flight crew of the aircraft may not have access to the pallets, for example, once the aircraft is fully loaded and ready for flight. As a result, if a fire were to occur on a pallet located in the aircraft cabin, the flight crew might not necessarily have access to the pallet experiencing the fire, thereby preventing the flight crew from attempting to control or extinguish the fire with a hand-held fire extinguisher. Such a situation may present a great risk to the survival of the aircraft and/or the flight crew and any passengers aboard the aircraft.

There may exist a desire to provide a device for containing and/or suppressing a fire associated with one or more objects located on a base structure. There may exist a desire to provide a method for containing and/or suppressing a fire associated with one or more objects located on a base structure. For example, there may exist a desire to provide a device and/or method for containing and/or suppressing a fire associated with one or more objects located on a pallet.

The invention may seek to satisfy one or more of the above-mentioned desires. Although the present invention may obviate one or more of the above-mentioned desires, it should be understood that some aspects of the invention might not necessarily obviate them.

SUMMARY OF THE INVENTION

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes a device for containing and/or suppressing a fire, which may include a flexible barrier configured to at least substantially cover at least one item located on a base structure. The flexible barrier may include a flexible sheet and an intumescent material layer substantially covering at least one surface of the flexible sheet.

In another aspect, a method for containing and/or suppressing a fire associated with at least one item located on a base structure may include placing a flexible barrier over the at least one item. The flexible barrier may include a flexible sheet and an intumescent material layer substantially covering a surface of the flexible sheet.

Aside from the structural and procedural arrangements set forth above, the invention could include a number of other arrangements such as those explained hereinafter. It is to be understood that both the foregoing description and the following description are exemplary only.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

DESCRIPTION OF EXEMPLARY EMBODIMENTS

Figure 1:
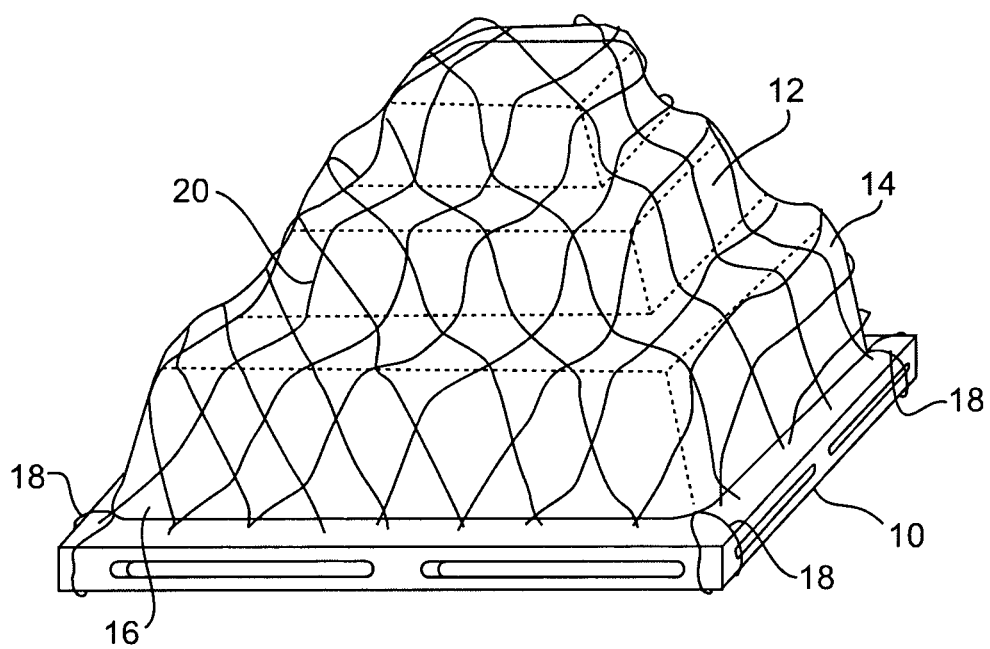
FIG. 1 is a schematic perspective view including an exemplary embodiment of a device for containing and/or suppressing a fire.

Reference will now be made in detail to a few exemplary embodiments of the invention. Wherever possible, the same reference numbers are used in the drawings and the description to refer to the same or like parts.

FIG. 1 depicts a base structure 10 and one or more objects 12 located on the base structure 10. The base structure 10 may include, for example, a pallet (e.g., a pallet for storing and/or transporting the object(s)). The object(s) 12, may include, for example, cardboard boxes containing products, hazardous materials containers, and/or explosive materials. The object(s) 12 may be at least substantially covered with, for example, a device 14 for containing and/or suppressing a fire. For example, an exemplary embodiment of the device 14 may include a flexible barrier 16 arranged to at least substantially cover the object(s) 12 located on the base structure 10. The device 14 may further include cords 18 for holding the flexible barrier 16 in place. The objects 12 may also be at least substantially covered with, for example, a plastic material (e.g., a shrink-wrap plastic material) (not shown) and/or a netting material 20 (e.g., a cargo netting material) configured for example, to prevent the object(s) 12 from shifting during transport.

Figure 2:
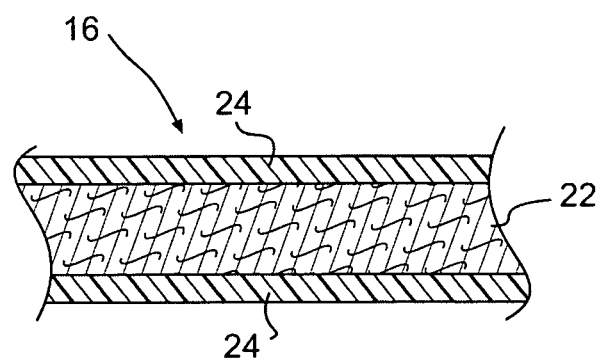
FIG. 2 is a schematic partial cross-section view of an exemplary embodiment of a flexible barrier.

Referring to FIG. 2, some embodiments of the flexible barrier 16 may include a flexible sheet 22, for example, a flexible sheet of treated fabric or cloth (e.g., fire retardant fabric, fiberglass cloth (e.g., e-glass cloth, s-glass cloth and/or any other fiberglass cloth known to persons having skill in the art), and/or treated fiberglass cloth). The flexible barrier 16 may further include one or more layers 24 of an intumescent material. For example, flexible barrier 16 may include a layer of intumescent material 24 on either or both surfaces of flexible sheet 22. The intumescent material may include, for example, a flexible latex-type material sometimes marketed as PyroBlok®, although any other suitable intumescent materials known to persons having skill in the art may be used.

Referring again to FIG. 1, flexible barrier 16 may be placed over the objects 12 located on the base structure 10, and the flexible barrier 16 may be pulled tightly against the objects 12, for example, via cords 18. The flexible barrier 16 may, for example, be in the form of an inverted bag-like structure (see, e.g., FIG. 4), and the flexible barrier 16 may be cinched down around the base of the objects 12 on the base structure 10, for example, such that the amount of air able to travel underneath the edges of the flexible barrier 16 and/or within the confines of the flexible barrier 16 is substantially limited.

According to some embodiments, the device 14 make act, for example, by being cinched down tightly against the object(s) 12 contained under the netting material 20 adjacent to the base structure 10. The device 14 may fit tightly enough, for example, that it does not allow enough air under the flexible barrier 16 to allow heat of a fire to increase enough to spread the fire beyond the flexible barrier 16. For example, according to some embodiments, as heat from a fire increases, the heat may activate the intumescent material 24, for example, such that the intumescent material 24 expands and chars such that the flexible barrier 16 substantially prevents any air from outside the flexible barrier from entering underneath the barrier to provide oxygen and/or other fuel for the fire. In this manner, the fire may be substantially contained and/or suppressed.

According to some embodiments (not shown), the device for containing and/or suppressing a fire may be integrally formed as a single piece along with a netting material. According to some embodiments (not shown), the device for containing and or suppressing a fire may be configured such that the flexible barrier 16 may be placed over a netting material and may be cinched around the base of the base structure 10.

Figure 3:
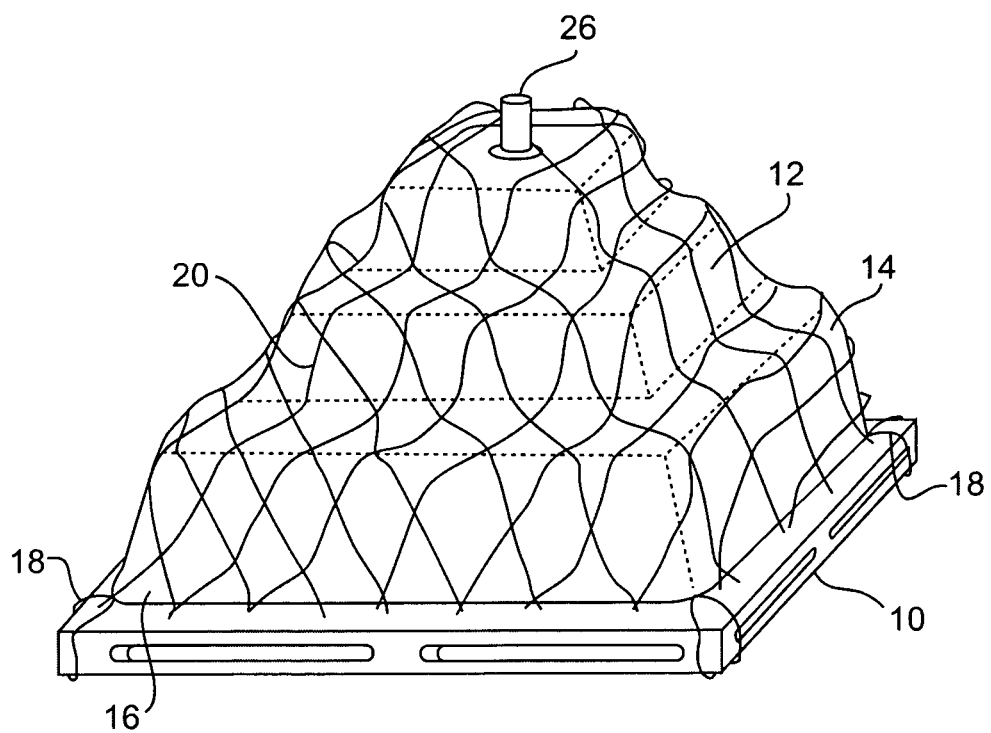
FIG. 3 is a schematic perspective view including another exemplary embodiment of a device for containing and/or suppressing a fire.

In the exemplary embodiment depicted in FIG. 3, the device for containing and/or suppressing a fire may include a tube 26 (e.g., a flexible tube) located, for example, on a top portion of the flexible barrier 16. The tube 26 may be configured such that a fire extinguishing agent may be supplied (e.g., via injection) under the flexible barrier 16.

Figure 4:
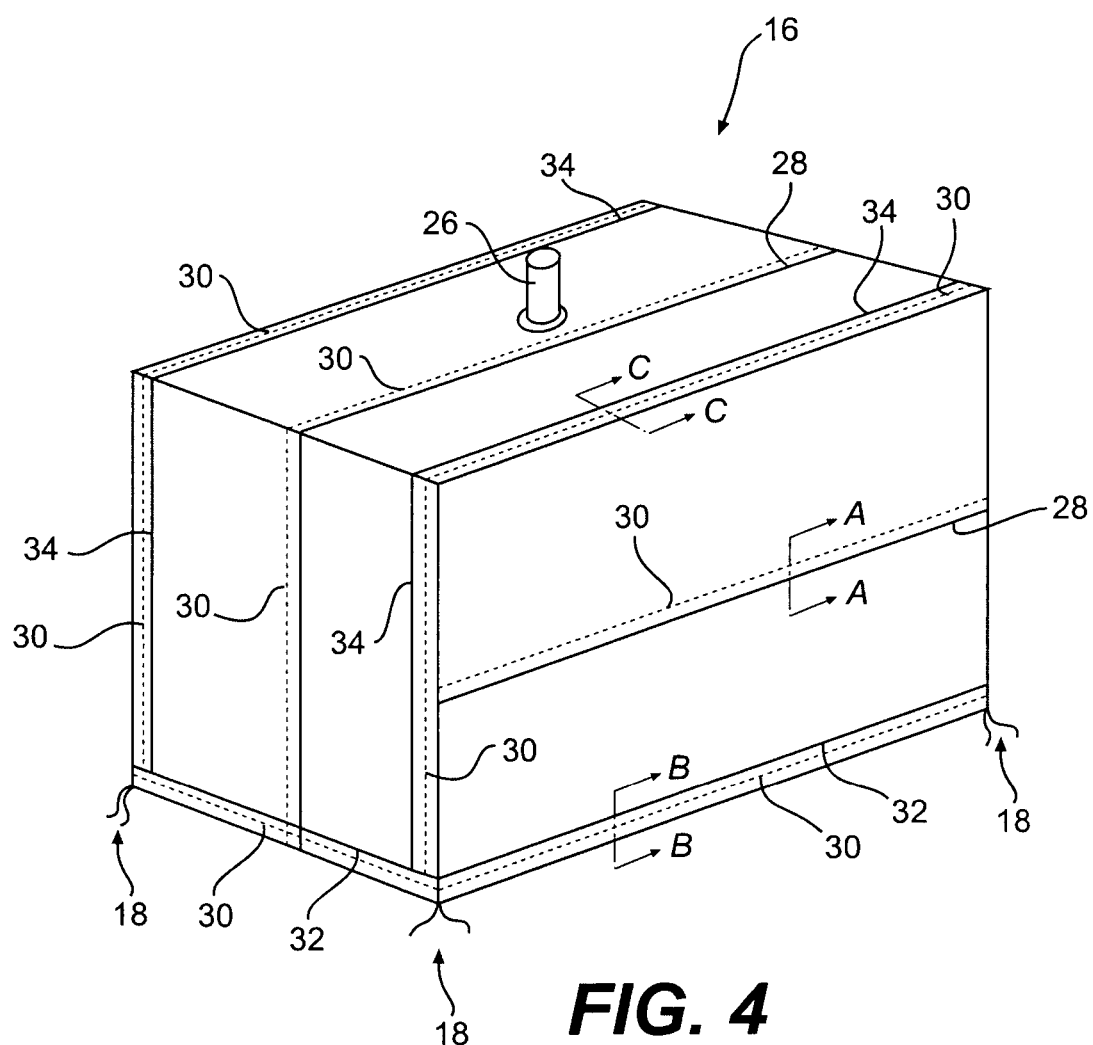
FIG. 4 is a schematic perspective view of an exemplary embodiment of a flexible barrier.

Referring to the exemplary embodiment depicted in FIG. 4, the flexible barrier 16 may be configured in, for example, a generally box-like shape having an open bottom. According to some embodiments, the flexible barrier 16 may be formed as a single unitary piece of flexible sheet 22. According to other embodiments, the flexible barrier 16 may be formed from a number of sections of the flexible sheet 22, for example, as depicted in FIG. 4. The device 14 may include a tube 26 configured to permit, for example, fire extinguishing agent to be supplied to an interior defined by the flexible barrier 16. According to some embodiments, the flexible barrier 16 may be provided with one or more cords 18 configured to permit the flexible barrier 16 to be secured to a base structure.

Figure 5A:
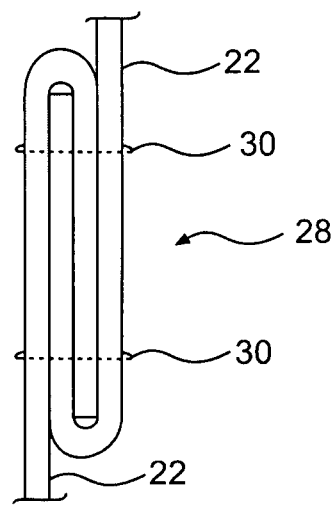
FIG. 5A is a section view taken along line A-A of FIG. 4.

In flexible barrier embodiments formed of a number of sections of the flexible sheet 22, for example, as in the exemplary embodiment depicted in FIG. 4, the sections may be secured to one another, for example, via seams 28, 32, and/or 34. For example, a seam 28 may be provided, which secures two sections of the flexible barrier material to one another along an upper surface and/or side surfaces of the flexible barrier 16. As schematically depicted in FIG. 5A, for example, one section of the flexible sheet 22 may be secured to another section of the flexible sheet 22 by folding over edges of each of the sections of the flexible sheet 22 such that four layers of the flexible sheet 22 may be secured to one another via one or more rows of stitching 30.

Figure 5C:
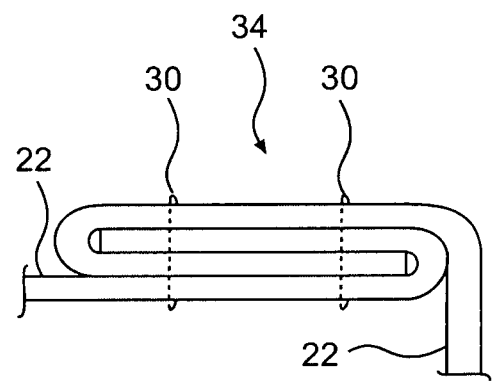
FIG. 5C is a section view taken along line C-C of FIG. 4.
Figure 5B:
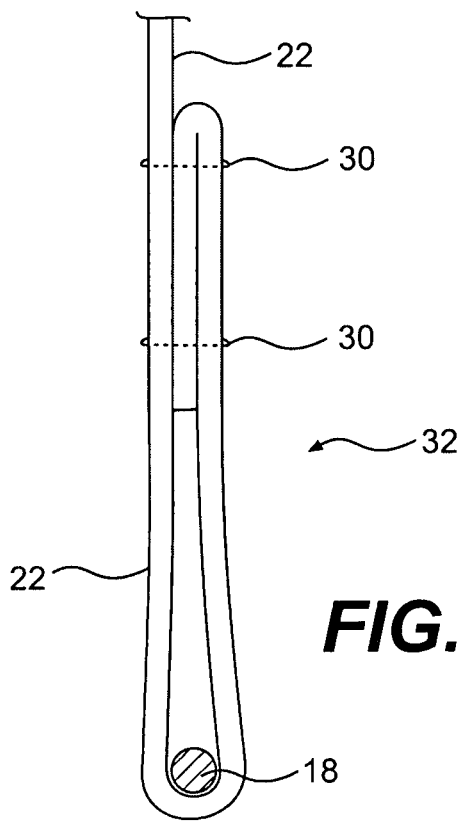
FIG. 5B is a section view taken along line B-B of FIG. 4.

According to some embodiments, a seam 32 along a bottom edge of the flexible barrier 16 may be configured to provide a sleeve for receiving, for example, one or more cords 18, as schematically-depicted in FIG. 5B. The seam 32 may formed, for example, by folding an edge of a section of the flexible sheet 22 over on itself at least once (e.g., twice). As shown in FIG. 5B, for example, the edge of the section of the flexible sheet 22 may be folded over itself twice such that three layers of the flexible sheet 22 may be secured to one another via one or more rows of stitching 30.

According to some embodiments, the sides of flexible barrier 16 may be formed from one or more sections of the flexible sheet 22, which may be secured to one or more sections of the flexible sheet 22 forming the upper portion of the flexible barrier 16 along seam 34. Referring to FIG. 5C, for example, the seam 34 may be formed by folding edges of adjoining sections of the flexible sheet 22 over one another such that four layers of the flexible sheet 22 may be secured to one another via one or more rows of stitching 30.

It will be apparent to those skilled in the art that various modifications and variations can be made to the structure and methodology described herein. Thus, it should be understood that the invention is not limited to the subject matter discussed in the specification. Rather, the present invention is intended to cover modifications and variations.

What is claimed is:

1. A device for containing and/or suppressing a fire, the device comprising:
   a flexible barrier configured to at least substantially cover at least one item located on a base structure,
   wherein the flexible barrier comprises
      a flexible sheet,
      an intumescent material layer substantially covering a surface of the flexible sheet, and
      a cargo netting material configured to prevent objects from shifting on a pallet,
   wherein the flexible sheet comprises at least one of fire retardant fabric, fiberglass cloth, e-glass cloth, and s-glass cloth.

2. The device of claim 1, further comprising a second intumescent layer substantially covering a second surface of the flexible sheet.

3. The device of claim 1, wherein the flexible sheet comprises at least one of treated fabric and treated cloth.

4. The device of claim 1, further comprising at least one cord configured to tighten the flexible barrier around the at least one item adjacent to the base structure.

5. The device of claim 1, wherein the flexible barrier is formed from a plurality of sections of the flexible sheet.

6. The device of claim 1, further comprising a tube operably associated with the flexible barrier, the tube being configured to permit fire extinguishing agent to be provided under the flexible barrier.

7. A method for containing and/or suppressing a fire associated with at least one item located on a pallet for storing or transporting the item, the method comprising:
 placing a flexible barrier over the at least one item, the flexible barrier comprising a flexible sheet and an intumescent material layer substantially covering a surface of the flexible sheet, such that a fire associated with the at least one item is substantially contained under the flexible barrier,
 wherein placing the flexible barrier over the at least one item occurs before a fire associated with the at least one item starts.

8. The method of claim 7, further comprising tightening the flexible barrier around a base of the at least one item via a cord.

9. The method of claim 7, wherein the flexible barrier further comprises a second intumescent material layer substantially covering a second surface of the flexible sheet.

10. A device for containing and/or suppressing a fire, the device comprising:
 a flexible barrier configured to at least substantially cover at least one item located on a base structure,
 wherein the flexible barrier comprises
  a flexible sheet, and
  an intumescent material layer substantially covering a surface of the flexible sheet; and
 a tube operably associated with the flexible barrier, the tube being configured to permit fire extinguishing agent to be provided under the flexible barrier.

11. Freight comprising:
 a pallet configured to be carried via a vehicle;
 at least one object located on the pallet; and
 a device for containing and/or suppressing a fire associated with the at least one object, the device comprising
  a flexible barrier at least substantially covering the at least one object located on the pallet,
  wherein the flexible barrier comprises
   a flexible sheet, and
   an intumescent material layer substantially covering a surface of the flexible sheet.

12. The freight of claim 11, wherein the pallet is configured to be carried via aircraft.

13. The device of claim 1, wherein the cargo netting material is part of an integral single piece defining the flexible barrier.

* * * * *